(12) United States Patent
Sames et al.

(10) Patent No.: US 6,871,279 B2
(45) Date of Patent: Mar. 22, 2005

(54) METHOD AND APPARATUS FOR SECURELY AND DYNAMICALLY MANAGING USER ROLES IN A DISTRIBUTED SYSTEM

(75) Inventors: David L. Sames, Woodbine, MD (US); Gregg W. Tally, Ellicott City, MD (US)

(73) Assignee: Networks Associates Technology, Inc., Santa Clara, CA (US)

(*) Notice: Subject to any disclaimer, the term of this patent is extended or adjusted under 35 U.S.C. 154(b) by 865 days.

(21) Appl. No.: 09/813,419

(22) Filed: Mar. 20, 2001

(65) Prior Publication Data

US 2002/0138738 A1 Sep. 26, 2002

(51) Int. Cl.[7] .............................................. G06F 9/00
(52) U.S. Cl. ...................... 713/185; 713/171; 713/201; 713/166; 713/155; 713/200; 380/186; 380/277; 380/278; 707/104.1; 707/200; 707/9; 707/10
(58) Field of Search ........................... 713/185, 166, 713/165, 156, 155, 164, 200, 201, 182; 707/9, 10, 104.1, 200; 380/277, 278

(56) References Cited

U.S. PATENT DOCUMENTS

| | | | | |
|---|---|---|---|---|
| 6,055,534 A | * | 4/2000 | Nishino | 707/10 |
| 6,061,726 A | * | 5/2000 | Cook et al. | 709/226 |
| 6,185,678 B1 | * | 2/2001 | Arbaught et al. | 713/2 |
| 6,202,157 B1 | * | 3/2001 | Brownlie et al. | 713/201 |
| 6,216,231 B1 | * | 4/2001 | Stubblebine | 713/201 |
| 6,246,771 B1 | * | 6/2001 | Stanton et al. | 380/186 |
| 6,256,741 B1 | * | 7/2001 | Stubblebine | 713/201 |
| 6,275,825 B1 | * | 8/2001 | Kobayashi et al. | 707/9 |
| 6,381,579 B1 | | 4/2002 | Gervais et al. | 705/8 |
| 6,430,694 B1 | * | 8/2002 | Hosein et al. | 713/400 |
| 6,438,549 B1 | | 8/2002 | Aldred et al. | 707/9 |
| 6,484,258 B1 | * | 11/2002 | Haverty | 713/155 |
| 6,499,110 B1 | * | 12/2002 | Moses et al. | 713/201 |
| 6,507,909 B1 | * | 1/2003 | Zurko et al. | 713/164 |
| 6,516,316 B1 | * | 2/2003 | Ramasubramani et al. | 707/9 |
| 6,539,093 B1 | * | 3/2003 | Asad et al. | 380/279 |
| 6,584,567 B1 | * | 6/2003 | Bellwood et al. | 713/171 |
| 6,594,661 B1 | | 7/2003 | Tagg | 707/9 |

OTHER PUBLICATIONS

Joon S. Park et al., "Binding Identities and Attributes Using Digitally Signed Certificates", Laboratory for Information Security Technology (LIST) George Mason University, VA, 2000.

Cooper, David A., "A More Efficient Use of Delta–CRLs", May 2000 Proceedings of the 2000 IEEE Symposium on Security and Privacy.

* cited by examiner

*Primary Examiner*—Ly V. Hua
(74) *Attorney, Agent, or Firm*—Zilka Kotab, PC; Christopher J. Hamaty (57) ABSTRACT

One embodiment of the present invention provides a system for managing user attributes that determines access rights in a distributed computing system. The system modifies an attribute database, wherein the attribute database includes a plurality of possible user attributes and a plurality of users. Next, for a given user the system obtains an identity certificate from a certificate authority. This identity certificate is associated with a user from the attribute database. The system also assigns an attribute to the user from the possible user attributes, whereby the user is granted access rights based on the attribute and the identity certificate. This attribute is stored in the attribute database. Finally, modifications to the attribute database are distributed to a plurality of hosts coupled together by a network.

24 Claims, 6 Drawing Sheets

METHOD AND APPARATUS FOR SECURELY AND DYNAMICALLY MANAGING USER ROLES IN A DISTRIBUTED SYSTEM

GOVERNMENT LICENCE RIGHTS

This invention was made with United States Government support under contract #F30602-97-C-92-0268 funded by the Defense Advanced Research Projects Agency (DARPA) through Rome Laboratories. The United States Government has certain rights in the invention.

BACKGROUND

1. Field of the Invention

The present invention relates to distributed systems. More specifically, the present invention relates to a method and an apparatus for securely and dynamically managing user attributes in distributed systems.

2. Related Art

The recent explosion of distributed computing systems and their attendant problems have led to many innovative solutions to ensure commonality, interoperability, and standardization.

One of the more perplexing problems associated with distributed computing systems is access control. Typically, a security administrator establishes access control mechanisms based on the privilege attributes of a user, such as user roles. User roles can include accountant, payroll clerk, order entry clerk, and the like. A user is granted access to only the required data to perform the functions of an assigned attribute and is prevented from accessing data that is not required to perform these functions. It should be noted that a user can be authorized for several roles and can select any authorized role for access at a given time. Access identity, group, and clearance level are examples of other privilege attributes that might be used for making access decisions.

One method for establishing access control is to use X.509 certificates. X.509 certificates are typically issued, signed, and maintained by a certificate authority (CA). There are currently two kinds of information supported by X.509 certificates: identity and attributes. Authentication services use identity certificates to verify the identity of a user, while attribute certificates contain privilege attribute information associated with the user such as a user role, access identity, group, or clearance level. Under X.509, an attribute certificate must be bound to an identity certificate.

Using attribute certificates causes difficulties for managing user attributes. A user must be issued one or more attribute certificates for each assigned attribute. Issuing these attribute certificates ties the access control mechanism directly to a public key infrastructure, thereby making the process of issuing attribute certificates more difficult. In addition, an attribute certificate must be checked for validity each time the user assumes the attribute authorized by the certificate.

Typically, checking the attribute certificate for validity involves scanning certificate revocation lists (CRLs) maintained by the CA. Checking these CRLs can be a time consuming process, which is exacerbated by the use of attribute certificates for attribute management. Using attribute certificates also requires a secure method to distribute the attribute assignments from the administrative area where the assignment is made to the access control engine actually making the decision. In addition, distribution of CRLs is an issue because CRLs can grow very large for a large organization. Information within a CRL must be retained until the certificate expires.

Another way to establish access control is by using extensions to X.509 certificates to indicate the user's assigned attributes. These extensions, however, impose additional administrative overhead and support requirements within a system. Furthermore, many certificate servers do not enable certificate extensions, and many secure socket layer (SSL) applications do not support certificates with extensions. Therefore, using extensions to X.509 certificates is not a viable solution.

What is needed is a method and an apparatus for managing user attributes in a distributed system, without using certificates for attribute-based access control.

SUMMARY

One embodiment of the present invention provides a system for managing user attributes that determines access rights in a distributed computing system. The system modifies an attribute database, wherein the attribute database includes a plurality of possible user attributes and a plurality of users. Next, for a given user the system obtains an identity certificate from a certificate authority. This identity certificate is associated with a user from the attribute database. The system also assigns an attribute to the user from the possible user attributes, whereby the user is granted access rights based on the attribute and the identity certificate. This attribute is stored in the attribute database. Finally, modifications to the attribute database are distributed to a plurality of hosts coupled together by a network.

In one embodiment of the present invention, the system assigns a second attribute from the possible user attributes to the user, based on an additional assigned function for the user. The system stores this second attribute in the attribute database.

In one embodiment of the present invention, the system uses secure communications for distributing modifications to the attribute database to the plurality of hosts.

In one embodiment of the present invention, the system signs the attribute database with a cryptographic signature to allow detection of unauthorized changes to the attribute database.

In one embodiment of the present invention, a host can distribute modifications to the attribute database to a subordinate host in a tree architecture.

In one embodiment of the present invention, the system allows the user to assume any attribute stored in the attribute database that is assigned to the user.

In one embodiment of the present invention, the system deletes the attribute assigned to the user from the attribute database. After deleting the attribute from the attribute database, the system redistributes the attribute database to the plurality of hosts.

In one embodiment of the present invention, modifying the attribute database includes creating a new attribute database.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Host Computing Systems

Figure 1:
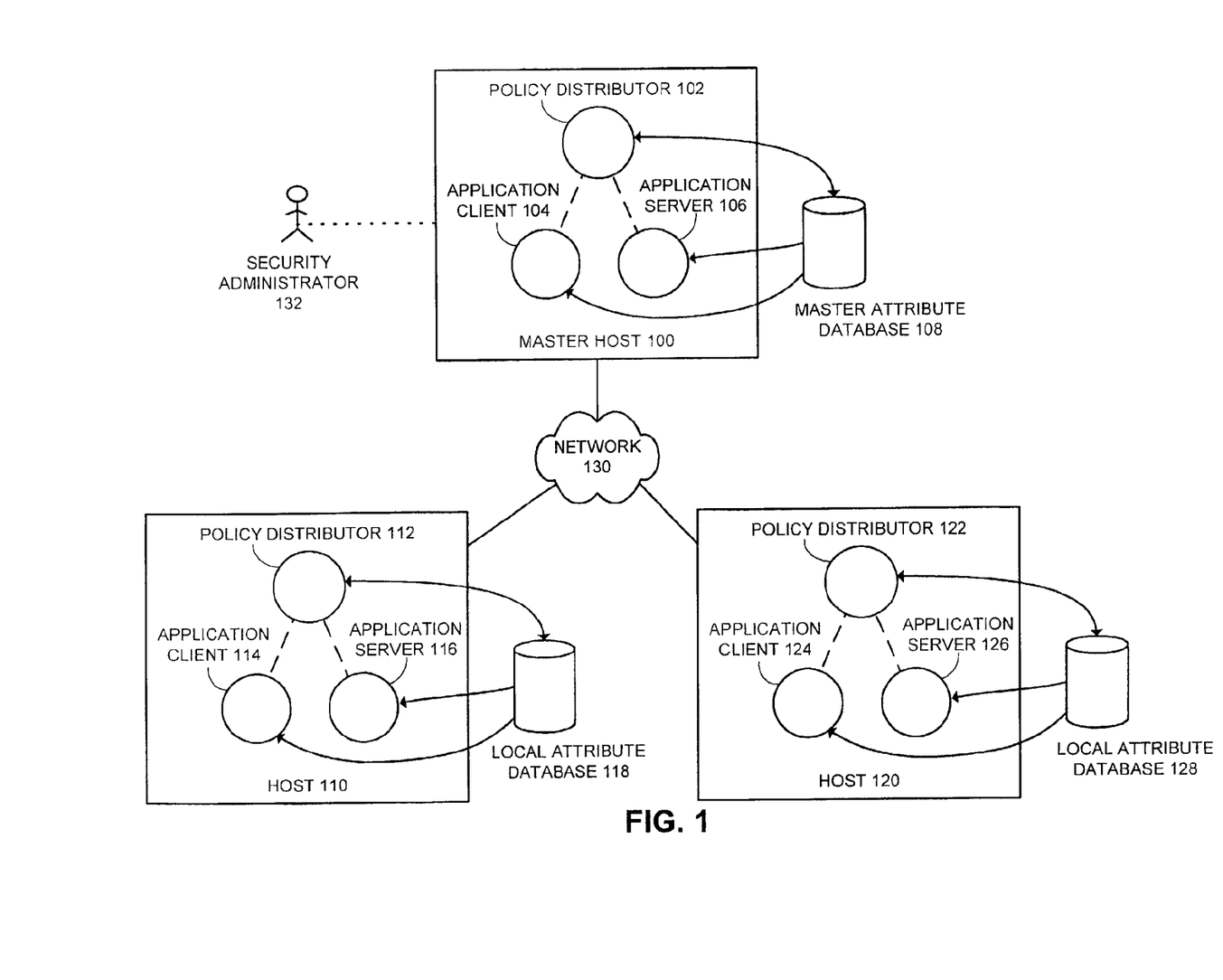
FIG. 1 illustrates host systems coupled together in accordance with an embodiment of the present invention.

FIG. 1 illustrates host systems coupled together in accordance with an embodiment of the present invention. Master host 100, and hosts 110 and 120 are coupled together by network 130. The system can include additional hosts. Master host 100, hosts 110 and 120, and any additional hosts within the system are arranged logically into a hierarchy with master host 100 at the top of the hierarchy. Additional hosts may be arranged to be logically subordinate to master host 100, host 110, host 120, or to any other host within the hierarchy.

Master host 100 and hosts 110 and 120 can generally include any type of computer system, including, but not limited to, a computer system based on a microprocessor, a mainframe computer, a digital signal processor, a portable computing device, a personal organizer, a device controller, and a computational engine within an appliance.

Network 130 can generally include any type of wire or wireless communication channel capable of coupling together computing nodes. This includes, but is not limited to, a local area network, a wide area network, or a combination of networks. In one embodiment of the present invention, network 130 includes the Internet.

Master host 100, and hosts 110 and 120 include policy distributors 102, 112 and 122, application clients 104, 114, and 124, and application servers 106, 116, and 126 respectively. In addition, master host 100, and hosts 110 and 120 are coupled to master attribute database 108, and local attribute databases 118 and 128 respectively. Any additional host within the system has a configuration equivalent to the configuration of hosts 110 and 120.

During operation of the system, security administrator 132 interacts with master host 100 to create and maintain master attribute database 108. The master attribute database includes a list of users, a list of possible attributes, and a mapping of attributes to users. It should be noted that the mapping is a many-to-many mapping such that a user can be mapped to more than one attribute and more than one user can be mapped to an attribute.

After master attribute database 108 has been created, policy distributor 102 establishes a secure link with policy distributors 112 and 122 within hosts 110 and 120 respectively. Policy distributors 102, 112, and 122 operate in concert to copy master attribute database 108 to local attribute database 118 and local attribute database 128. In like manner, each policy distributor may contact other policy distributors within the system to provide each host within the system a local attribute database. Note that master attribute database 108 is signed with a cryptographic signature prior to distribution so that tampering with master attribute database 108, and local attribute databases 118 and 128 can be detected.

Application clients 104, 114, and 124 and application servers 106, 116, and 126 validate user access rights by accessing master attribute database 108 and local attribute databases 118 and 128 respectively. Application clients 104, 114, and 124 and application servers 106, 116, and 126 are notified by policy distributors 102, 112, and 122 when master attribute database 108 and local attribute databases 118 and 128 respectively have been updated.

Attribute Database

Figure 2A:
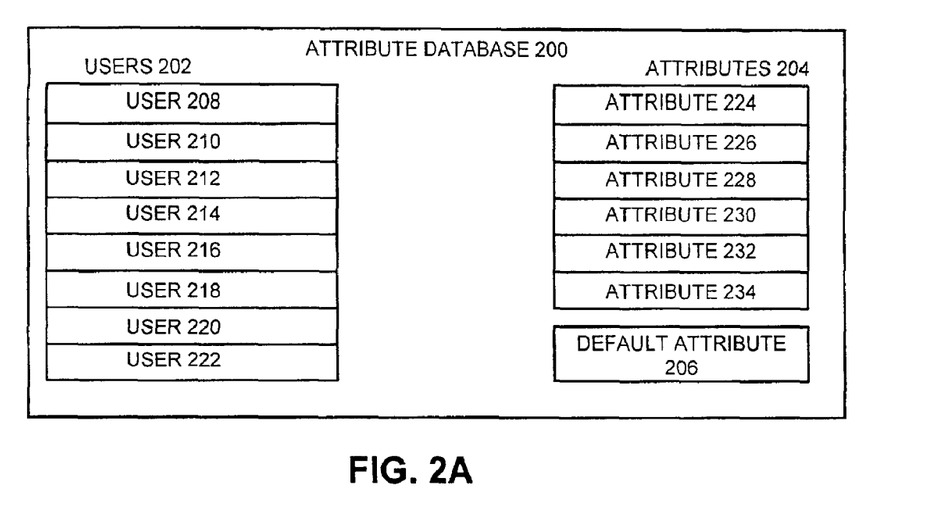
FIG. 2A illustrates details of attribute database 200 in accordance with an embodiment of the present invention.

FIG. 2A illustrates details of attribute database 200 in accordance with an embodiment of the present invention. Attribute database 200 includes a list of users 202, a list of possible attributes 204, and a default attribute 206. Attribute database 200 can be stored on any type of system for storing data in non-volatile storage. This includes, but is not limited to, systems based upon magnetic, optical, and magneto-optical storage devices, as well as storage devices based on flash memory and/or battery-backed up memory.

Default attribute 206 is provided to give all users within users 202 a minimum set of privileges. Security administrator 132 authorizes each user from users 202 access to one or more of attributes 204 to increase a user's privileges as described in conjunction with FIG. 2B.

Users 202 includes user 208, 210, 212, 214, 216, 218, 220, and 222. Attributes 204 includes attribute 224, 226, 228, 230, 232, and 234. It will be obvious to a practitioner skilled in the art that security administrator 132 can extend users 202 and attributes 204 to any practical limit.

Figure 2B:
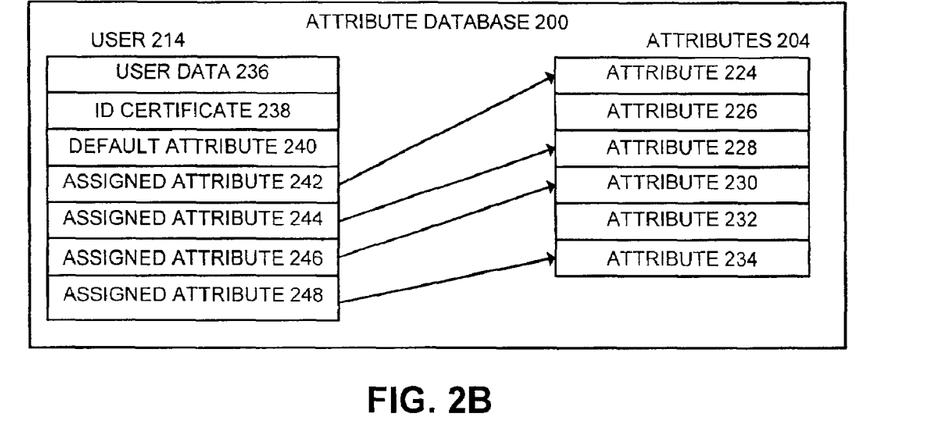
FIG. 2B illustrates attribute mapping within attribute database 200 in accordance with an embodiment of the present invention.

FIG. 2B illustrates attribute mapping within attribute database 200 in accordance with an embodiment of the present invention. Security administrator 132 assigns several parameters for each user—for example user 214—within attribute database 200. These parameters include, but are not limited to, personal user data 236, identity certificate 238, default attribute 240, and several assigned attributes—such as assigned attributes 242, 244, 246, and 248. Note that the number of assigned attributes can be more or less than indicated in this example.

In operation, security administrator 132 maps each one of a user's assigned attributes to attributes 204 as illustrated. In this example, assigned attribute 242, 244, 246, and 248 are mapped to attribute 224, 228, 230, and 234 respectively. User 214 can then assume each of these attributes as desired. User 214 will be denied access to attribute 226 and attribute 232.

Creating an Attribute Database

Figure 3:
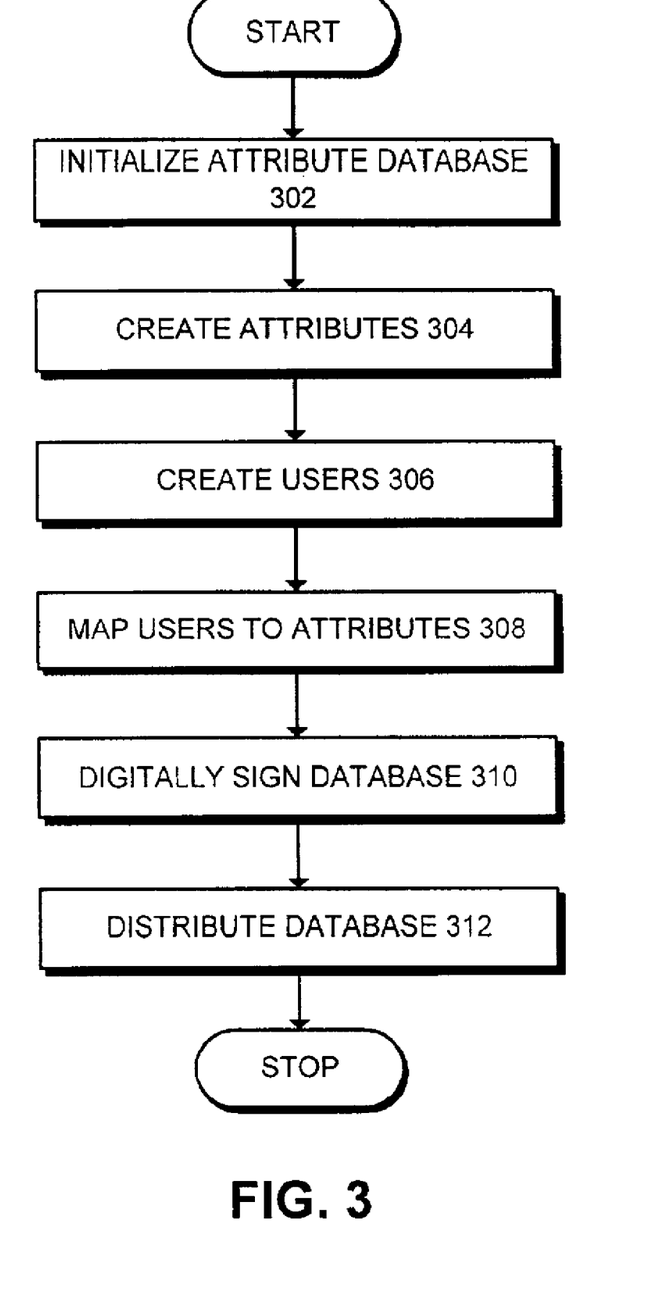
FIG. 3 is a flowchart illustrating the process of creating an attribute database in accordance with an embodiment of the present invention.

FIG. 3 is a flowchart illustrating the process of creating an attribute database in accordance with an embodiment of the present invention. The system starts when security administrator 132 initializes master attribute database 108 (step 302). After initializing master attribute database 108, security administrator 132 creates the list of possible attributes 204 (step 304).

Next, security administrator 132 creates the list of users 202 (step 306). Security administrator 132 then maps each of users 202 to the user's assigned attributes within attributes 204 (step 308).

After establishing attribute database 200, security administrator 132 uses a cryptographic process to digitally sign attribute database 200 (step 310). Finally, security administrator 132 causes policy distributor 102 to distribute attribute database 200 to hosts 110 and 120 (step 312). Note that non-critical changes can be distributed in a "batched" manner, so that multiple changes to the attribute database are held until security administrator 132 chooses distribution or some threshold is reached. The system forces distribution for critical changes.

Adding and Deleting Users

Figure 4:
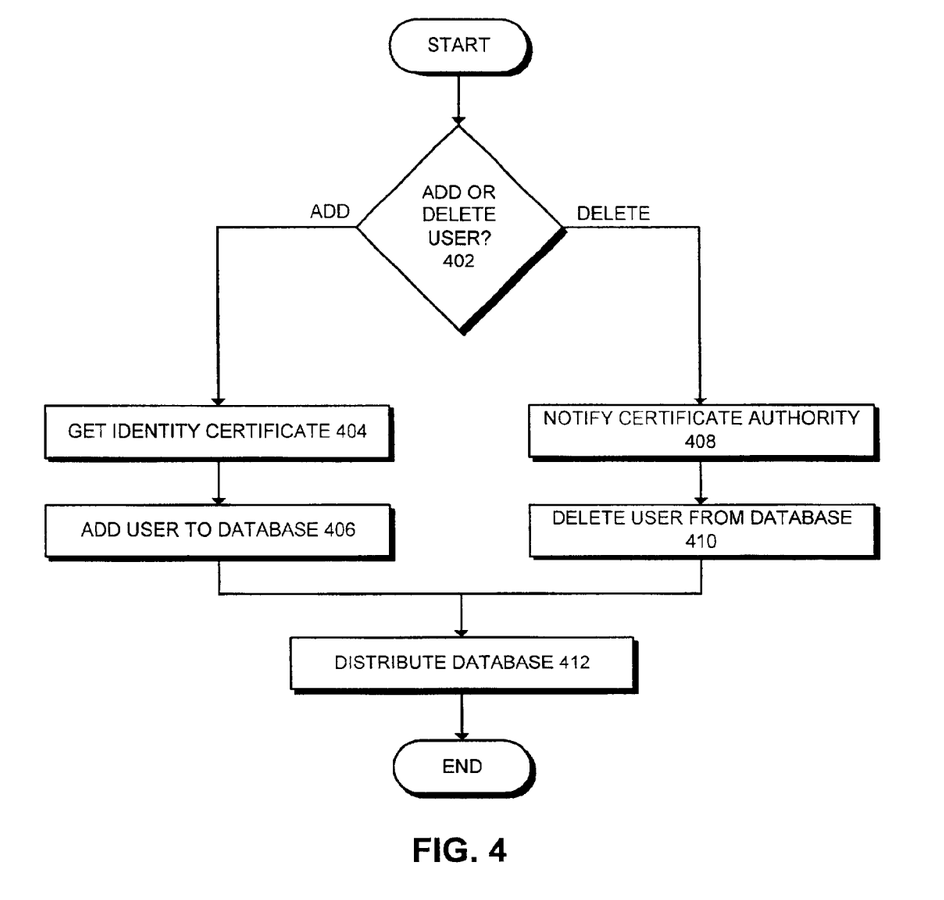
FIG. 4 is a flowchart illustrating the process of adding and deleting a user to an attribute database in accordance with an embodiment of the present invention.

FIG. 4 is a flowchart illustrating the process of adding and deleting a user to an attribute database in accordance with an embodiment of the present invention. The system starts by determining if security administrator 132 is adding or deleting a user (step 402). If security administrator 132 is adding a user, the system obtains an identity certificate for the user from a certificate authority (step 404). After obtaining the identity certificate, the system adds the user to users 202 (step 406).

If security administrator 132 is deleting a user at 402, the system first notifies the certificate authority that the user's identity certificate is no longer valid (step 408). After the certificate authority has been notified that the identity certificate is no longer valid, the system deletes the user from users 202 (step 410).

Finally, security administrator 132 causes policy distributor 102 to distribute attribute database 200 to hosts 110 and 120 (step 412). Note that non-critical changes can be distributed in a "batched" manner, so that multiple changes to the attribute database are held until security administrator 132 chooses distribution or some threshold is reached. The system forces distribution for critical changes.

Attribute Mapping

Figure 5:
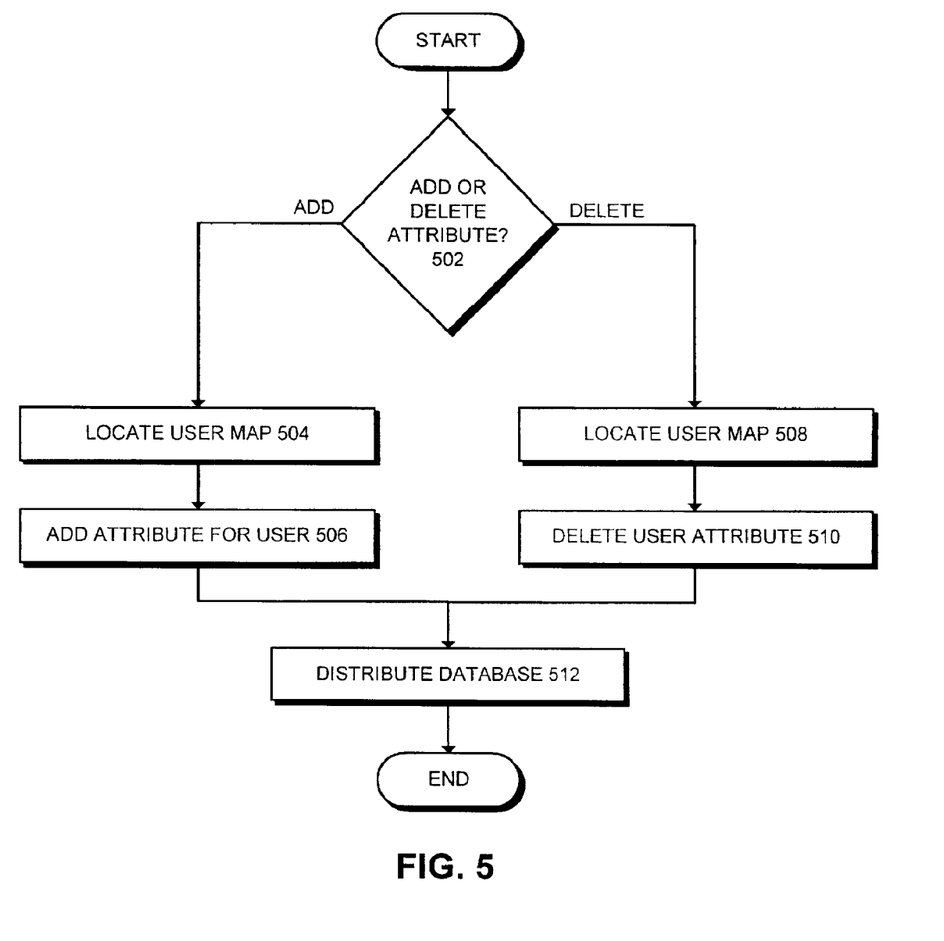
FIG. 5 is a flowchart illustrating the process of adding and deleting an attribute for a user in accordance with an embodiment of the present invention.

FIG. 5 is a flowchart illustrating the process of adding and deleting an attribute for a user in accordance with an embodiment of the present invention. The system starts by determining if security administrator 132 is adding or deleting an attribute for a user (step 502). If security administrator 132 is adding an attribute for a user, the system first locates the user record within users 202 (step 504). After locating the users record within users 202, the system adds the new attribute for the user (step 506).

If security administrator 132 is deleting an attribute for a user at 502, the system first locates the user record within users 202 (step 508). After locating the users record within users 202, the system deletes the attribute for the user (step 510).

Finally, security administrator 132 causes policy distributor 102 to distribute attribute database 200 to hosts 110 and 120 (step 512). Note that non-critical changes can be distributed in a "batched" manner, so that multiple changes to the attribute database are held until security administrator 132 chooses distribution or some threshold is reached. The system forces distribution for critical changes.

Distributing an Attribute Database

Figure 6:
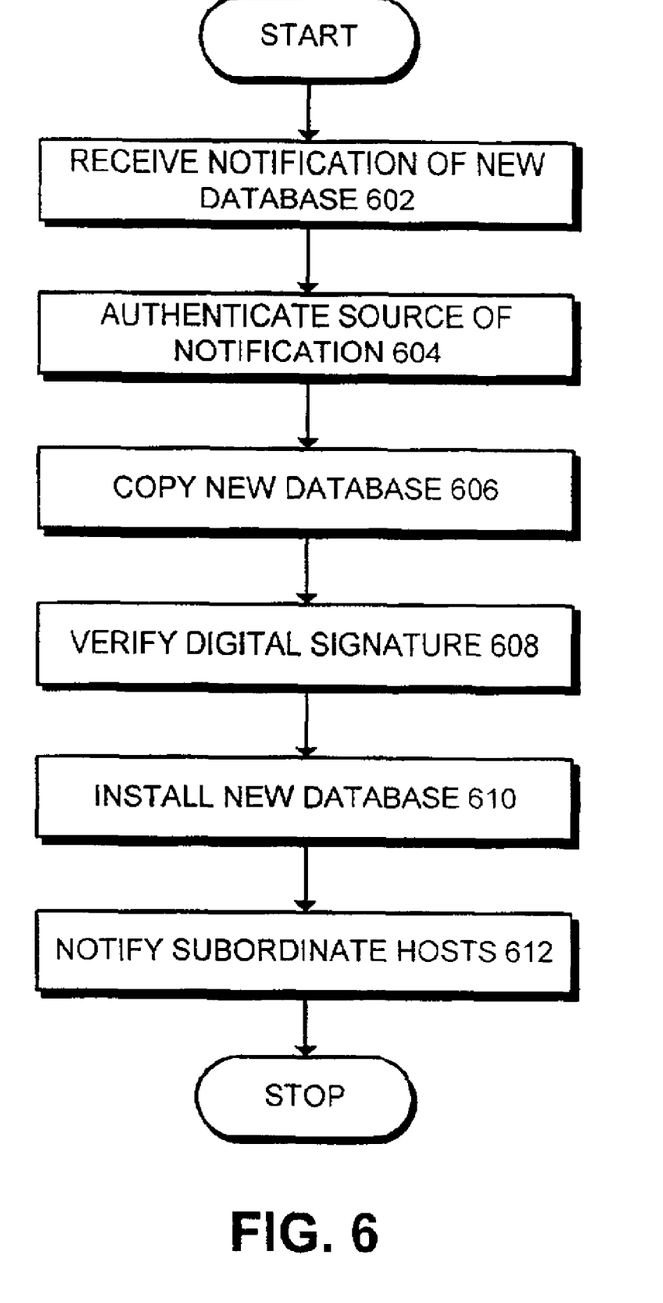
FIG. 6 is a flowchart illustrating the process of distributing an attribute database in accordance with an embodiment of the present invention.

FIG. 6 is a flowchart illustrating the process of distributing an attribute database in accordance with an embodiment of the present invention. The system starts when policy distributor 102, 112, or 122 receives notification that a new attribute database 200 is available for distribution (step 602). Note that policy distributor 102 receives the notification from security administrator 132, while hosts 110 and 120 receive the notification, either directly or indirectly, from master host 100. To facilitate distribution of attribute database 200, the hosts within the system are arranged hierarchically. When a policy distributor receives notification of a new attribute database 200, the policy distributor notifies subordinate policy distributors as described below. Each policy distributor performs the same actions, therefore only policy distributor 112 will be described herein.

After receiving notification of a new attribute database 200, policy distributor 112 authenticates the source of the notification using any available cryptographic method (step 604). If the source of the notification is a valid source at 604, policy distributor copies new attribute database 200 to local storage across network 130 (step 606). Next, policy distributor 112 verifies the digital signature accompanying new attribute database 200 (step 608).

If the digital signature is valid at 608, policy distributor 112 installs new attribute database 200 as local attribute database 118 (step 610). After installing new attribute database 200, policy distributor 112 notifies the policy distributor within any subordinate host of the hierarchy of hosts that a new attribute database 200 is available (step 612).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for managing user attributes in a distributed computing system, wherein user attributes determine access rights to a computer application: the method comprising:

modifying an attribute database in order to create modifications, wherein the attribute database includes a plurality of possible user attributes and a data structure identifying a plurality of users;

obtaining an identity certificate from a certificate authority;

associating the identity certificate with a user from the plurality of users within the attribute database, thus creating more of the modifications;

assigning an attribute from the plurality of possible user attributes to the user;

storing the attribute assigned to the user into the attribute database, thus creating more of the modifications; and distributing the modifications to the attribute database to a plurality of hosts coupled together by a networks;

wherein the user is granted access rights based on the attribute and the identity certificate.

2. The method of claim 1, further comprising:

assigning a second attribute from the plurality of possible user attributes to the user, in addition to said attribute; and storing the second attribute assigned to the user into the attribute database, thus creating more of the modifications.

3. The method of claim 1, further comprising using secure communications when distributing the modifications to the attribute database to the plurality of hosts.

4. The method of claim 1, further comprising signing the attribute database with a cryptographic signature prior to the distributing to allow detection of unauthorized changes to the attribute database.

5. The method of claim 1, wherein a host of the plurality of hosts can distribute the modifications to the attribute database to a subordinate host in a tree architecture.

6. The method of claim 1, further comprising allowing the user to assume any attribute stored into the attribute database that is assigned to the user during the assigning.

7. The method of claim 1, further comprising:
deleting the attribute assigned to the user from the attribute database, after the distributing, thus creating more of the modifications; and
redistributing the modifications to the attribute database to the plurality of hosts.

8. The method of claim 1, wherein modifying the attribute database includes creating the attribute database.

9. A computer-readable storage medium storing instructions that when executed by a computer cause the computer to perform a method for managing user attributes in a distributed computing system, wherein user attributes determine access rights to a computer application: the method comprising:
modifying an attribute database in order to create modifications, wherein the attribute database includes a data structure identifying a plurality of possible user attributes and a plurality of users;
obtaining an identity certificate from a certificate authority;
associating the identity certificate with a user from the plurality of users within the attribute database, thus creating more of the modifications;
assigning an attribute from the plurality of possible user attributes to the user;
storing the attribute assigned to the user into the attribute database, thus creating more of the modifications; and
distributing the modifications to the attribute database to a plurality of hosts coupled together by a network;
wherein the user is granted access rights based on the attribute and the identity certificate.

10. The computer-readable storage medium of claim 9, the method further comprising:
assigning a second attribute from the plurality of possible user attributes to the user, in addition to said attribute; and
storing the second attribute assigned to the user into the attribute database, thus creating more of the modifications.

11. The computer-readable storage medium of claim 9, the method further comprising using secure communications when distributing the modifications to the attribute database to the plurality of hosts.

12. The computer-readable storage medium of claim 9, the method further comprising signing the attribute database with a cryptographic signature prior to the distributing to allow detection of unauthorized changes to the attribute database.

13. The computer-readable storage medium of claim 9, wherein a host of the plurality of hosts can distribute the modifications to the attribute database to a subordinate host in a tree architecture.

14. The computer-readable storage medium of claim 9, the method further comprising allowing the user to assume any attribute stored into the attribute database that is assigned to the user during the assigning.

15. The computer-readable storage medium of claim 9, the method further comprising:
deleting the attribute assigned to the user from the attribute database, after the distributing, thus creating more of the modifications; and
redistributing the modifications to the attribute database to the plurality of hosts.

16. The computer-readable storage medium of claim 9, wherein modifying the attribute database includes creating the attribute database.

17. An apparatus that facilitates managing user attributes in a distributed computing system, wherein user attributes determine access rights to a computer application: the apparatus comprising:
a modifying mechanism configured to modify an attribute database in order to create modifications, wherein the attribute database includes a data structure identifying a plurality of possible user attributes and a plurality of users;
an identity certificate obtaining mechanism configured to obtain an identity certificate from a certificate authority;
an associating mechanism configured to associated the identity certificate with a user from the plurality of users within the attribute database, thus creating more of the modifications;
an assigning mechanism configured to assign an attribute from the plurality of possible user attributes to the user;
a storing mechanism configured to store the attribute assigned to the user into the attribute database, thus creating more of the modifications; and
a distributing mechanism that is configured to distribute the modifications to the attribute database to a plurality of hosts coupled together by a network;
wherein the user is granted access rights based on the attribute and the identity certificate.

18. The apparatus of claim 17, further comprising:
the assigning mechanism that is further configured to assign a second attribute from the plurality of possible user attributes to the user, in addition to said attribute; and
the storing mechanism that is further configured to store the second attribute assigned to the user into the attribute database, thus creating more of the modifications.

19. The apparatus of claim 17, further comprising a secure communications mechanism configured to distribute the modifications to the attribute database to the plurality of hosts, during the distributing.

20. The apparatus of claim 17, further comprising a signing mechanism that is configured to sign the attribute database with a cryptographic signature prior to the distributing to allow detection of unauthorized changes to the attribute database.

21. The apparatus of claim 17, wherein the communications mechanism associated with a host of the plurality of hosts is configured to distribute the modifications to the attribute database to a subordinate host in a tree architecture.

22. The apparatus of claim 17, further comprising an authorization mechanism that is configured to authorize the user to assume any attribute stored into the attribute database that is assigned to the user during the assigning.

23. The apparatus of claim 17, further comprising:
a deleting mechanism that as configured to delete the attribute assigned to the user from the attribute database, after the distributing, thus creating more of the modifications; and a redistributing mechanism that is configured to redistribute the modifications to the attribute database to the plurality of hosts.

24. The apparatus of claim 17, wherein the modifying mechanism is further configured to create the attribute database.

* * * * *